US010524611B2

United States Patent
Kelly et al.

(10) Patent No.: US 10,524,611 B2
(45) Date of Patent: Jan. 7, 2020

(54) MULTI-PHASE CIRCUIT FLOW-THROUGH HEATER FOR AEROSPACE BEVERAGE MAKER

(71) Applicant: B/E Aerospace, Inc., Wellington, FL (US)

(72) Inventors: Luke E. Kelly, Basehor, KS (US); Brian P. Mills, Blue Springs, MO (US); Brian Rutherford, Stillwell, KS (US); Stuart A. Dietz, Topeka, KS (US)

(73) Assignee: B/E Aerospace, Inc., Winston Salem, NC (US)

( * ) Notice: Subject to any disclaimer, the term of this patent is extended or adjusted under 35 U.S.C. 154(b) by 65 days.

(21) Appl. No.: 14/754,641

(22) Filed: Jun. 29, 2015

(65) Prior Publication Data

US 2016/0000262 A1 Jan. 7, 2016

Related U.S. Application Data

(60) Provisional application No. 62/020,803, filed on Jul. 3, 2014.

(51) Int. Cl.
*A47J 31/54* (2006.01)
*F24H 1/10* (2006.01)

(52) U.S. Cl.
CPC .......... *A47J 31/545* (2013.01); *A47J 31/542* (2013.01); *F24H 1/101* (2013.01)

(58) Field of Classification Search
CPC ....... A47J 31/545; A47J 31/542; F24H 1/101; F24H 1/142; F24D 17/0078; H05B 1/02;
(Continued)

(56) References Cited

U.S. PATENT DOCUMENTS 3,898,428 A    8/1975    Dye et al.
4,289,954 A *  9/1981    Brognano ................. F24D 3/00
                                                              219/483
(Continued)

FOREIGN PATENT DOCUMENTS

CN           2765102 Y        3/2006
DE       102010009538 A1      7/2010
FR            583000 A        1/1925

OTHER PUBLICATIONS

International Search Report, dated Sep. 29, 2015, 4 pages, from PCT/US2015/038975.

(Continued)

*Primary Examiner* — Tu B Hoang
*Assistant Examiner* — Masahiko Muranami
(74) *Attorney, Agent, or Firm* — Suiter Swantz pc llo

(57) ABSTRACT

A water heater for an aircraft beverage brewing apparatus includes a three way electrical conduit for conducting electrical power in three separate phases. The heater has a housing with a fluid inlet port at a first removable end piece and a fluid outlet port at a second removable end piece. The hollow cylindrical core incorporates a heating element wound around the core, and the housing includes three resettable temperature sensors at the outlet, each of the three resettable temperature sensors connected to a separate phase of power from the three way electrical conduit.

5 Claims, 3 Drawing Sheets

(58) Field of Classification Search
CPC .. H05B 1/0244; H05B 3/0052; H05B 1/0291; H05B 2203/021
USPC ....... 392/478, 308, 304, 314, 316, 318, 319, 392/322, 337, 341, 398, 429, 441, 444, 392/445, 447, 449, 453, 465, 479, 480, 392/481, 488, 320, 323, 324, 325, 329, 392/451, 491, 493; 99/275, 281, 288, 99/294, 300, 316, 330, 331, 332, 333, 99/337, 342, 356, 361, 365, 279, 280; 219/494, 535, 537, 546, 552, 497, 482, 219/483, 486, 490, 505, 507
See application file for complete search history.

(56) References Cited

U.S. PATENT DOCUMENTS

| | | | | |
|---|---|---|---|---|
| 4,808,793 A * | 2/1989 | Hurko | .................... | F24H 1/102 |
| | | | | 392/480 |
| 4,949,627 A | 8/1990 | Nordskog | | |
| 5,408,917 A | 4/1995 | Lussi | | |
| 5,647,269 A * | 7/1997 | Miller | .................... | A47J 31/54 |
| | | | | 99/279 |
| 5,777,833 A * | 7/1998 | Romillon | ............. | H02H 7/0822 |
| | | | | 318/729 |
| 6,384,384 B1 * | 5/2002 | Connolly | ............... | H05B 3/746 |
| | | | | 219/449.1 |
| 6,779,435 B1 * | 8/2004 | Iacobucci | ............. | A47J 31/005 |
| | | | | 392/449 |
| 7,822,325 B2 * | 10/2010 | Murphy | .................. | F24H 1/201 |
| | | | | 219/494 |
| 7,822,326 B2 | 10/2010 | Commette et al. | | |
| 7,861,644 B2 | 1/2011 | Ghassemlou et al. | | |
| 9,945,620 B2 * | 4/2018 | Semmes | ............. | F24D 19/0095 |
| 2002/0086545 A1 * | 7/2002 | O'Donnell | ........ | H01J 37/32467 |
| | | | | 438/710 |
| 2003/0021597 A1 | 1/2003 | Chu | | |
| 2005/0279216 A1 * | 12/2005 | Miller | .................... | A47J 31/106 |
| | | | | 99/279 |
| 2006/0222351 A1 * | 10/2006 | Cezayirli | ................ | F24H 1/102 |
| | | | | 392/490 |
| 2006/0289454 A1 * | 12/2006 | Morgandi | ............ | H05B 1/0272 |
| | | | | 219/481 |
| 2009/0007792 A1 * | 1/2009 | Glucksman | ........... | A47J 31/057 |
| | | | | 99/282 |
| 2010/0092164 A1 * | 4/2010 | Ziehm | ..................... | F24H 1/142 |
| | | | | 392/485 |
| 2010/0232772 A1 | 9/2010 | Chiu et al. | | |
| 2012/0057857 A1 | 3/2012 | Kenney et al. | | |
| 2013/0312617 A1 * | 11/2013 | Toporovsky | .......... | A47J 31/005 |
| | | | | 99/280 |
| 2014/0076171 A1 * | 3/2014 | Ramus | .................... | A47J 31/54 |
| | | | | 99/300 |
| 2016/0000262 A1 | 1/2016 | Kelly et al. | | |

OTHER PUBLICATIONS

Office Action dated Oct. 10, 2018 for EP Application No. 17211096.
Office Action dated Nov. 2, 2018 for CN Patent Application No. 201580044793.X.

* cited by examiner

MULTI-PHASE CIRCUIT FLOW-THROUGH HEATER FOR AEROSPACE BEVERAGE MAKER

CROSS-REFERENCES TO RELATED APPLICATIONS

This application claims priority from U.S. Application No. 62/020,803, filed Jul. 3, 2014, the contents of which is fully incorporated by reference herein in its entirety.

BACKGROUND

Coffee makers are prevalent in many environments because of society's affection for the beverage, and thus many industries endeavor to offer their customers or patrons coffee as a way to make the experience more enjoyable. From automobile service stations to bookstores, there are few places where a customer cannot get a cup of coffee these days. One such place that patrons can expect a cup of hot coffee is during commercial airplane flights of medium to large distances. Passengers have come to expect this service on commercial flights, and airline manufacturers have developed special coffee brewing machines that meet the specific requirements and limitations of electrical appliances on aircraft.

All coffee brewing apparatus include some form of water heating element to raise the temperature of the water to a level where the oils and extracts of the coffee beans can be released. Water is pumped through a tubing with a resistive heating element that heats the water as it flows through the tubing. The resistive heating element is typically a coiled wire, similar to the element in an electric toaster, that heats up when electricity is run through it. In a resistive element like this, the coil is embedded in a plaster to make it more rugged. The heating element serves multiple purposes, namely to initially raise the temperature of the supply water to brewing temperature, and then when the coffee is made, the heating element keeps the coffee warm.

The resistive heating element may be sandwiched between a warming plate and an aluminum water tube. The resistive heating element presses directly against the underside of the warming plate, and white, heat-conductive materials such as grease make sure the heat transfers efficiently. The coffee maker's power switch turns power to the heating element on and off, and to keep the heating element from overheating there are sensors and fuses. In coffee makers, sensors detect if the coil is getting too hot and, if so, cut off the electrical current. When the coil cools down, the sensor turns the current back on. By cycling on and off like this, coffee brewers keep the coil at an even temperature. Similarly, fuses simply cut the power if the temperature reaches a certain level. Fuses are a safety measure in the event that the main sensor fails. Coffee makers also typically employ a one-way valve. The one-way valve lets cold water into the aluminum tube, but forces the bubbles of boiling water to flow up the brew tube.

The present invention is directed to a flow-through type water heater for a beverage maker, and more particularly to a flow-through water heater for an aircraft galley appliance for making beverage, the appliance having three-phase power capability and a removable baffle core. Most flow-through heating assemblies use a single phase power source to energize the heating element. Examples of such heating assemblies include plasma-sprayed circuit flow-through heaters from Watlow Electric Manufacturing Company of St. Louis, Mo. These heaters receive a flow of water from a water supply and heat the water to a temperature that is appropriate for brewing coffees, teas, espressos, and the like. However, there are several characteristics of such heating units that make them unsuitable for use in aircraft. First, aircraft power systems utilize a three-phase power that cannot be used with the aforementioned single phase heaters. Second, the core of the prior art heating units are fixed, which makes it challenging to determine if deposits are affecting the performance of the heating core. That is, traditional heater assemblies are welded together into a single piece, so the core and end fittings can not be removed. Thus, the inner passage way of the heater that the water flows through cannot be well monitored for hard water scale buildup. In addition, the current baffles are made from stainless steel, which is much heavier than the PEEK plastic used to fabricate the removable baffle core of the present invention. Third, such cores are typically made of a solid metal, adding weight to the beverage maker that is undesirable to aircraft components. Fourth, these cores lack the capability to effectively monitor the temperature of the water inside the core, which can lead to safety concerns as well as inefficiencies in the heating operation.

SUMMARY OF THE INVENTION

The present invention is designed to overcome these shortcomings and provide a three-phase heating unit for an aircraft beverage maker that includes a removable lightweight baffle core that can be easily removed and inspected to determine if maintenance is required. In a preferred embodiment, the heating unit includes integrated resistance temperature detectors (RTDs) that allow the actual heater temperature to be monitored directly, thereby avoiding an over-temperature condition, and incorporates fast-response temperature control. The heating unit of the present invention uses a custom circuit for three-phase power to manage the unique power requirements of an aircraft while providing efficient power management.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

The present invention comprises enhancements to prior art plasma-sprayed circuit flow-through heaters to make such heaters suitable for aircraft beverage maker applications. The enhancements include: 1) a high-performance, light weight plastic baffle core; 2) removable end fittings and baffle core, which allows for inspection of the core to check for hard water scale buildup inside the heater and enables maintenance and cleaning; 3) integrated RTDs, which allows the actual heater temperature to be monitored directly, thus avoiding an over-temperature situation and enabling fast-response temperature control in operation; and 4) a custom-designed circuit that incorporates three-phase power (essential for operation on aircraft) and dry steam production capability (particularly for espresso beverages) aboard aircraft.

The present invention is designed to be used in aircraft beverage makers with rapid in-line water heating and/or controlled steam production. The traditional heater design for non-aircraft use incorporates a single-phase electrical circuit. However, modern aircraft use a 400 Hz three-phase power supply to comply with FAA regulations. Thus, a multi-phase circuit must be incorporated into the heater. The heater of the present invention includes a plasma-sprayed circuit applied to a stainless steel substrate tube. Integrated resistance temperature detectors, or "RTD"s, are incorporated into the heater circuit that enables direct monitoring of the heater temperature. This not only provides for better temperature control of the heater circuit, but allows for improved safety as well.

Figure 1:
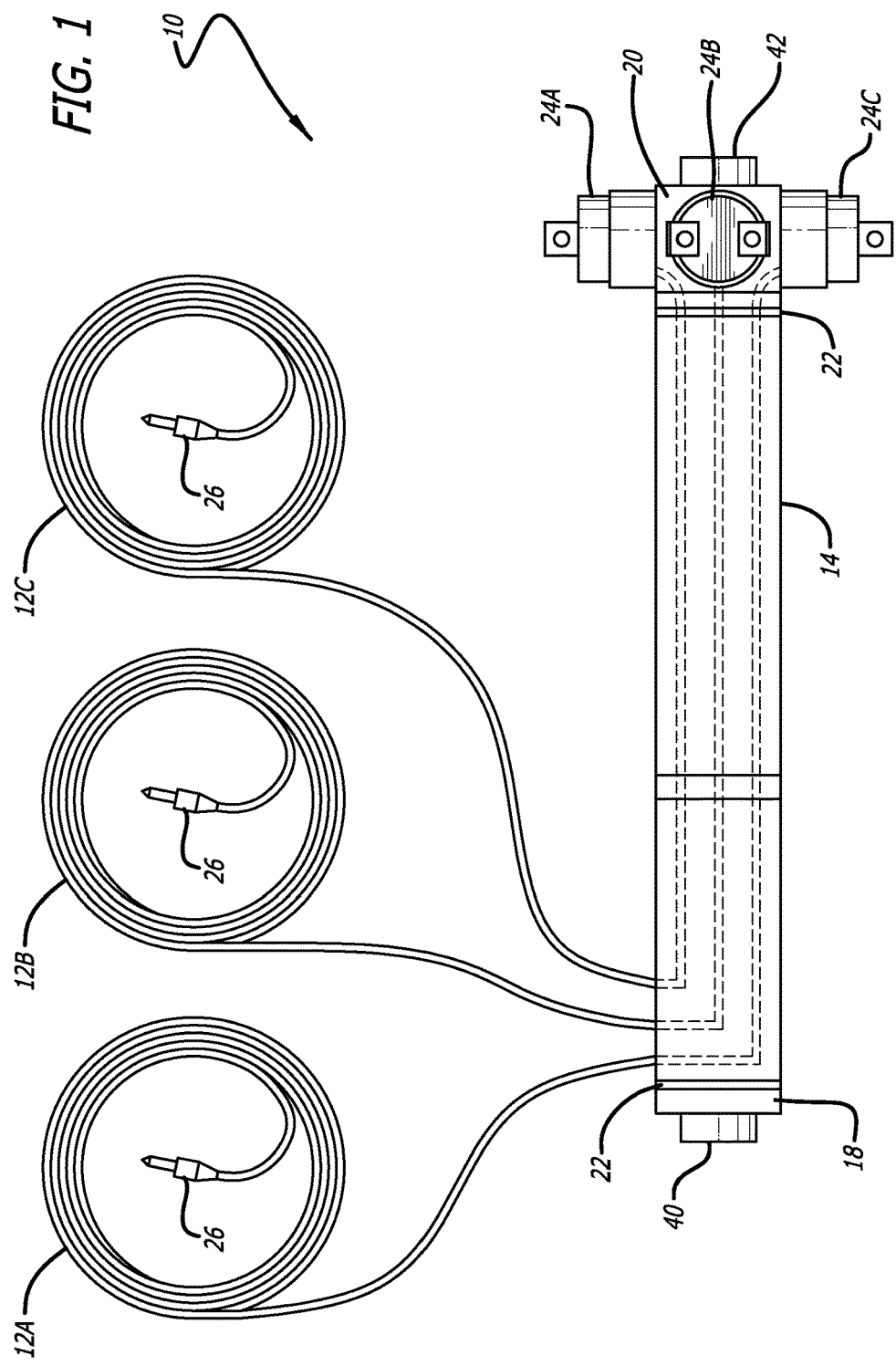
FIG. 1 is an illustration of an assembled heater unit.

FIG. 1 illustrates a fully assembled heating unit 10 of the present invention, with a three-way electrical conduit 12 that couple the heating unit 10 to a power supply (not shown). A steel tube housing body 14 houses a plastic baffle core 16, and end fittings 18,20 are threaded or otherwise removably attached to allow access to the core 16. A pair of O-rings 22 or washers are disposed between the end fittings 18,20 and the housing body 14. At the end of the housing are three resettable temperature sensors 24 a, 24 b, 24 c, one for each phase of the input power. By monitoring and regulating each phase of the power, the present invention provides a far more accurate evaluation of the temperature of the core 16, which in turn provides a measure of the water temperature and system performance. The three way electrical conduit 12 includes one jack 26 for each phase of the electrical power from the power supply, establishing a three-phase power system to convey the voltage to the heating unit 10 in three phases.

The removable end fittings 18,20 of the housing body 14 preferably incorporate machined screw threads 28 that screw into tapped holes 30 on each end of the baffle core 16. The end fittings 18,20 also have grooves on a mating surface that allow for seating and sealing of the end fittings when the unit 10 is assembled. The ability to quickly and easily disassemble the heater 10 also allows for flexibility with various end fittings for functional efficiency and enables easier cleaning and maintenance.

Figure 2:
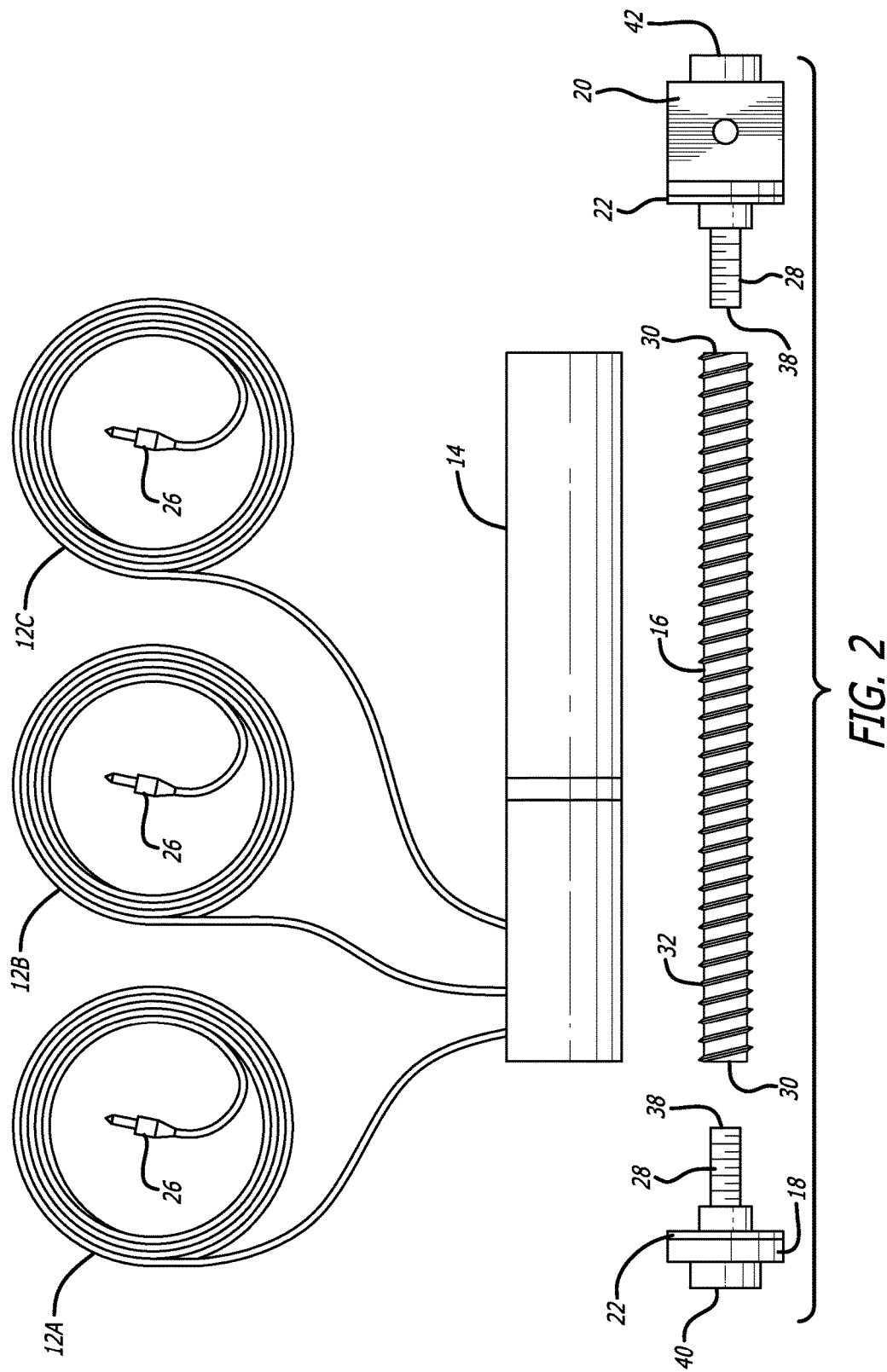
FIG. 2 is an illustration of the components of the heater unit of FIG. 1.

FIG. 2 illustrates an exploded view of the present invention of FIG. 1, where the housing 14 is separated from the removable end pieces 18,20 and the plastic baffle core 16 is exposed. Each fitting 18,20 inserts into the core 16, and water is heated by the resistive heater 32 inside the housing 14 as it is circulated around the core 16 from one end to the other. Each end piece 18,20 includes a stem 38 that fits into fitted holes 30 at the opposite ends of the baffle core 16. The inlet end piece 18 includes a port 40 for receiving a water stream, and the outlet end piece 20 includes a port 42 for the water to exit the heating unit 10. A washer 22 is preferably incorporated into each end piece 18,20 to resist leakage at the junctures with the housing 14. The core 16 may be made of plastic, such as PEEK, to reduce the weight of the core and thereby reduce the weight of the heating unit 10. The pitch of the threads 28 on the baffle core 16 may be selected so as to allow the residence of the water in the heating unit 10 to coincide with the heating characteristics of the resistive heating element 32 to efficiently heat the water therein.

Figure 3:
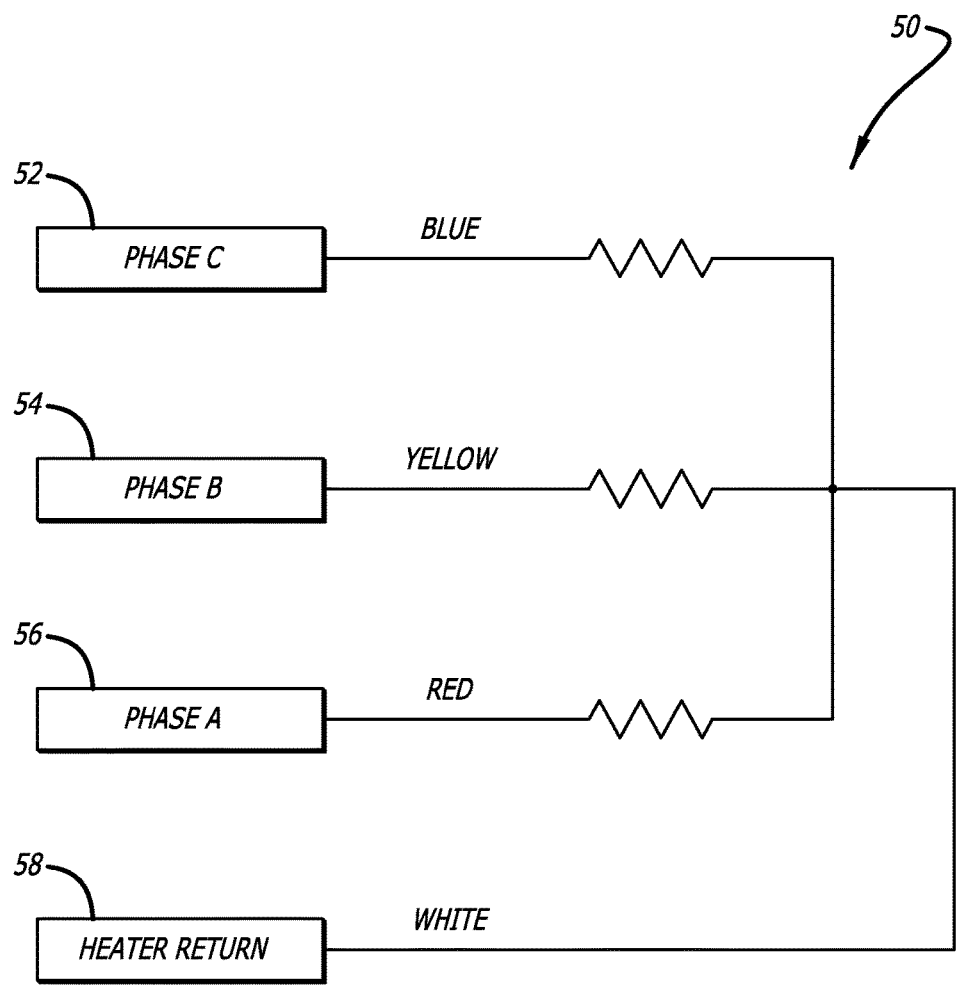
FIG. 3 is a circuit diagram for a three-phase power supply used on an aircraft.

FIG. 3 illustrates the plasma sprayed circuit 50 for the flow-through heater 10 of the present invention as incorporated into a brew heater. The power supply (not shown) is a 115 volt, three-phase power each having 805 watt maximum, for an 2415 watt total single zone at an operating temperature of 195° F. The wye configuration is shown in FIG. 3, including phase C (blue) 52, phase B (yellow) 54, and phase A (red) 56. The ground or heater return 58 is shown as well (white). The housing 14 is preferably 155 mm, although other sizes are possible, and the wires can be selected to be approximately 12 inches in length. The RTDs 24 (1 kΩ, Class 1B) are attached at the outlet end of the housing as shown in FIG. 1. In an alternate embodiment, the phases are each 533 watts for a total wattage of 1600 watts at an operating temperature of 300° F., which is used when the heater operates as both a water heater and a steam generator.

The three-phase heating unit for an aircraft beverage maker of the present invention incorporates a removable light-weight, easily removed baffle core allowing inspection of possible scale buildup in the heater. In a preferred embodiment, the heating unit includes integrated resistance temperature detectors (RTDs) that allow the actual heater temperature to be monitored directly, thereby avoiding an over-temperature condition and fast response temperature control. The heating unit of the present invention uses a custom circuit for three-phase power to manage the unique power requirements of an aircraft while providing efficient power management.

It will be apparent to those of ordinary skill in the art from the foregoing that while certain presently known preferred embodiments of the invention have been illustrated and described, various modifications can be made without departing from the spirit and scope of the invention. Accordingly, it is not intended that the invention be limited, except as by the appended claims.

We claim:

1. An aircraft beverage brewing apparatus water heater, comprising:
   a three way electrical conduit for conducting electrical power in three separate phases, wherein the three way electrical conduit includes three jacks with one jack for each phase, the electrical power enabling the water heater to generate heated water and steam;
   a housing body coupled to the three way electrical conduit, the housing body comprising a tube having a circuit applied thereto, the housing body including a first removable end piece and a second removable end piece, wherein the first and second removable end pieces include a threaded stem that engages a tapped hole at an end of a core, wherein the tube comprises a stainless-steel substrate tube;
   a fluid inlet port at the first removable end piece and a fluid outlet port at the second removable end piece;
   wherein the core is a hollow cylindrical core disposed in the housing body between the first and second removable end pieces, the hollow cylindrical core including a heating element wound around the core from a first end to a second end, wherein the hollow cylindrical core is made of plastic and is a one piece baffle core, and is removable from the tube when the second removable end piece is removed from the tube; and
   first, second, and third resettable temperature sensors disposed on the second removable end piece such that a temperature of the water heater is directly monitorable, each of the first, second, and third resettable temperature sensors connected to a separate phase of power from the three way electrical conduit such that each of the three separate phases is separately monitorable, wherein the first, second, and third resettable temperature sensors are resistance temperature detectors (RTDs), the second removable end piece comprises the three way electrical conduit and the first second, and third RTDs, and wherein the three way electrical conduit and the first, second, and third RTDs separate from the tube when the second removable end piece is removed from the tube.

2. The water heater of claim 1, wherein each phase in the three-phase power has a maximum 805 Watts.

3. The water heater of claim 2, where the operating temperature of the heater is 195° F.

4. The water heater of claim 1, wherein each phase in the three-phase power has a maximum 533 Watts.

5. The water heater of claim 4, where the operating temperature of the heater is 300° F.

* * * * *